United States Patent
Brockhoff

(10) Patent No.: US 7,204,541 B2
(45) Date of Patent: Apr. 17, 2007

(54) MOTOR VEHICLE

(75) Inventor: Franz-Ulrich Brockhoff, Bramsche (DE)

(73) Assignee: Wilhelm Karmann GmbH, Osnabrück (DE)

( * ) Notice: Subject to any disclaimer, the term of this patent is extended or adjusted under 35 U.S.C. 154(b) by 0 days.

(21) Appl. No.: 10/535,649

(22) PCT Filed: Nov. 18, 2003

(86) PCT No.: PCT/DE03/03816

§ 371 (c)(1),
(2), (4) Date: Dec. 1, 2005

(87) PCT Pub. No.: WO2004/045881

PCT Pub. Date: Jun. 3, 2004

(65) Prior Publication Data

US 2006/0131919 A1   Jun. 22, 2006

(30) Foreign Application Priority Data

Nov. 21, 2002   (DE) ................................ 102 54 365

(51) Int. Cl.
B60J 10/10   (2006.01)
(52) U.S. Cl. .......................... 296/107.01; 296/107.08; 296/116
(58) Field of Classification Search ........... 296/107.01, 296/108, 108.08, 107.16, 107.17, 117, 116
See application file for complete search history.

(56) References Cited

U.S. PATENT DOCUMENTS

| | | | | |
|---|---|---|---|---|
| 5,004,291 A | * | 4/1991 | Bauer et al. ................. | 296/116 |
| 5,645,309 A | * | 7/1997 | Graf ............................ | 296/117 |
| 5,823,606 A | * | 10/1998 | Schenk et al. .......... | 296/107.08 |
| 6,048,021 A | * | 4/2000 | Sautter, Jr. .............. | 296/107.08 |
| 6,237,986 B1 | * | 5/2001 | Neubrand et al. ...... | 296/107.01 |
| 6,409,247 B1 | * | 6/2002 | Maass ......................... | 296/116 |
| 6,416,111 B1 | * | 7/2002 | Neubrand ................... | 296/117 |
| 6,464,284 B2 | * | 10/2002 | Neubrand .............. | 296/107.01 |
| 6,497,447 B1 | * | 12/2002 | Willard ................. | 296/107.08 |
| 6,623,065 B2 | * | 9/2003 | Halbweiss et al. ...... | 296/107.16 |
| 6,793,267 B2 | * | 9/2004 | Hesselhaus ............ | 296/107.08 |
| 6,802,554 B1 | * | 10/2004 | Just et al. ................... | 296/116 |
| 6,832,805 B2 | * | 12/2004 | Quindt et al. ........... | 296/107.08 |
| 2002/0105205 A1 | | 8/2002 | Willard | |

FOREIGN PATENT DOCUMENTS

DE   39 30 343   3/1991

OTHER PUBLICATIONS

Patent Abstracts of Japan, vol. 0101, No. 15 (M-474), Apr. 30, 1986 & JP 60 244240 A (Takashi Adachi), Dec. 4, 1985.

* cited by examiner

*Primary Examiner*—Kiran B. Patel
(74) *Attorney, Agent, or Firm*—Friedrich Kueffner

(57) ABSTRACT

The invention relates a motor vehicle (1) comprising a roof (2) consisting of at least one part (3) which is completely displaceable between open and closed positions. In the closed position, said part of the roof is arranged between an area near a windscreen frame (4) and the rigid rear part of the roof (5, 5*a*). The inventive motor vehicle is constructed in such a way that the movable part of the roof (3) is divided into several adjacent sectors (15, 16) in order to enable a reduced width to pass to a normal width and vice versa by displacing said sectors and to move between the open and closed positions thereof when the width is reduced.

16 Claims, 15 Drawing Sheets

MOTOR VEHICLE

The invention concerns a motor vehicle with a roof that has at least one part that can be moved as a whole to open the roof in accordance with the introductory clause of claim 1 and in accordance with the introductory clause of claim 6.

DE 198 51 231 A1 describes a vehicle with a sliding sunroof, which can be opened by sliding the sunroof to the rear in the guides of a rear roof part. This sliding operation is only possible after a rear window, which is held in the guides in the closed state, has been displaced into a receiving space to the rear and below its closed position. This is associated with a considerable limitation of the available luggage space. In addition, this slows down the opening movement of the sliding sunroof, since it cannot be slid to the rear until the rear window has been moved. After the rearward displacement of the sliding sunroof, the lateral frame sections of the region in which the sliding sunroof was located in the closed position can be visually removed by swinging them in and displacing them below the rear C-posts. Therefore, the frame sections are designed with multiple parts and can be folded into one another. However, this both increases the manufacturing expense and weakens the stability of the frame sections. To be able to lower the sliding sunroof into a horizontal position after it has first been displaced, it is additionally necessary to rotate it, which further prolongs the opening time and increases the mechanical expense for a vehicle of this type.

The invention is based on the problem of creating a motor vehicle, which has a roof with at least one front roof part that can be moved as a whole between an open position and a closed position and which allows optimized lowering for the opening of the front, movable roof part.

The invention solves this problem with a motor vehicle with the features of claim 1 and a motor vehicle with the features of claim 6, which can be realized either individually or, in an especially advantageous way, in combination with one another. Advantageous modifications of the invention are specified in dependent claims 2 to 5 and 7 to 14.

In the design of the invention in accordance with claim 1, the expense of a vehicle of this type is considerably reduced. The lateral sections, say, frame parts, can be brought into the position that reduces the width of the roof part by simple inward displacement towards the middle section without it being necessary to fold the displaced sections together. If, as is advantageous, the movable roof part is divided into a middle section and two lateral sections, the lateral sections can, for example, simply be moved with the middle section in their position resting on the middle section.

In this regard, a solution that is very simple to realize provides for the lateral sections to be swung in towards the middle section.

The design in accordance with claim 6 ensures that the opening of the movable roof part does not require the use of guides of the rear roof part. Therefore, the roof part can be opened even without first moving a rear window. This reduces the time required to open the roof part and simplifies the movement mechanism. In particular, with a fin convertible top, a rear window can remain up, and the movement mechanism can be guided in a visually inconspicuous way in the stationary lateral fins of the rear roof part.

In a fin roof of this type, the movable roof part, even when it occupies, in its normal width, the entire width between the side windows, can be lowered between the fins by inward displacement of the lateral sections.

Other advantages and features of the invention are explained below with reference to the specific embodiments of the object of the invention illustrated in the drawings.

Figure 1:
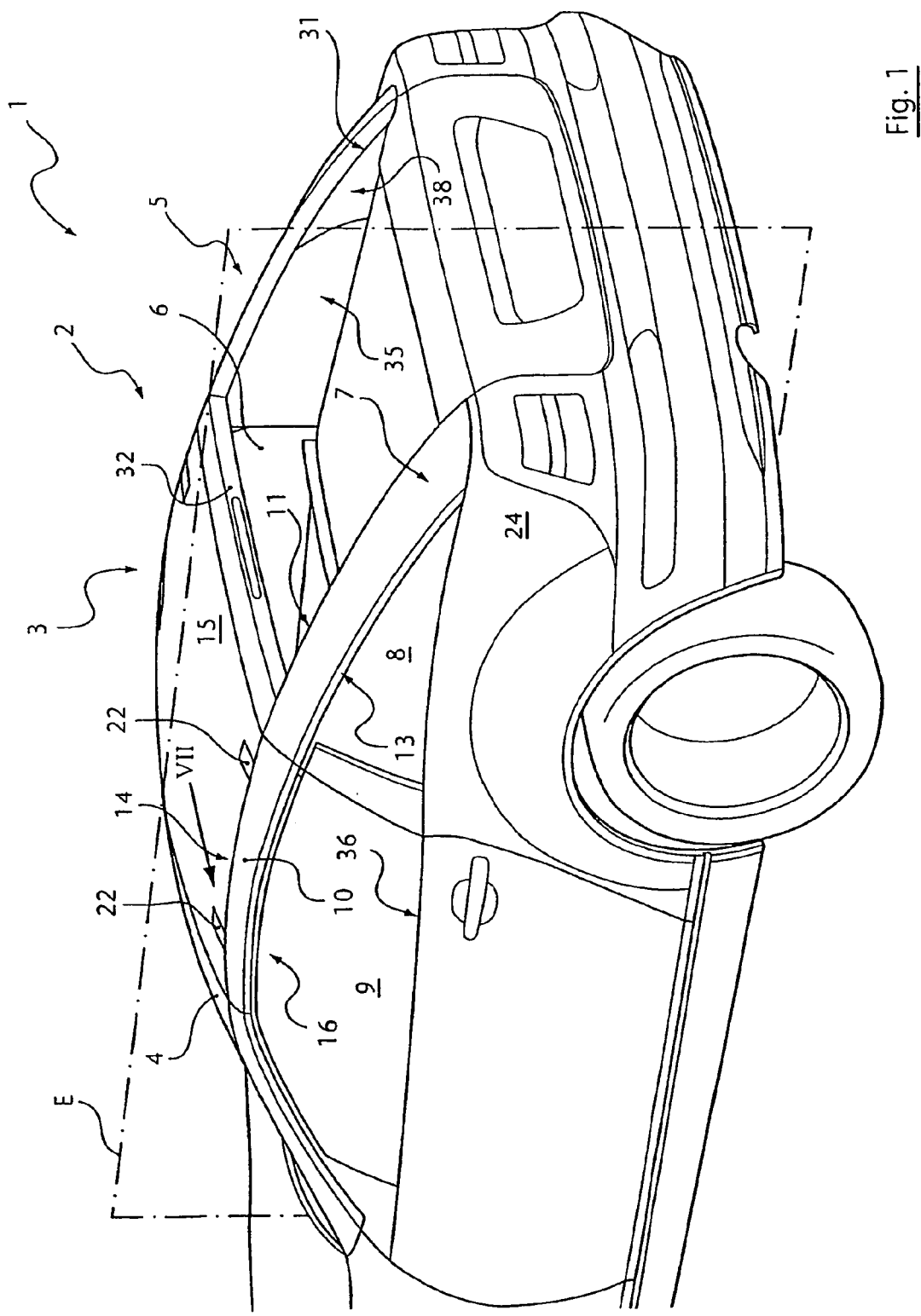
FIG. 1 shows a schematic, perspective overall view, which is broken off at the front, of a first motor vehicle in accordance with the invention with the roof closed, wherein the roof is designed as a so-called fin roof.
Figure 2:
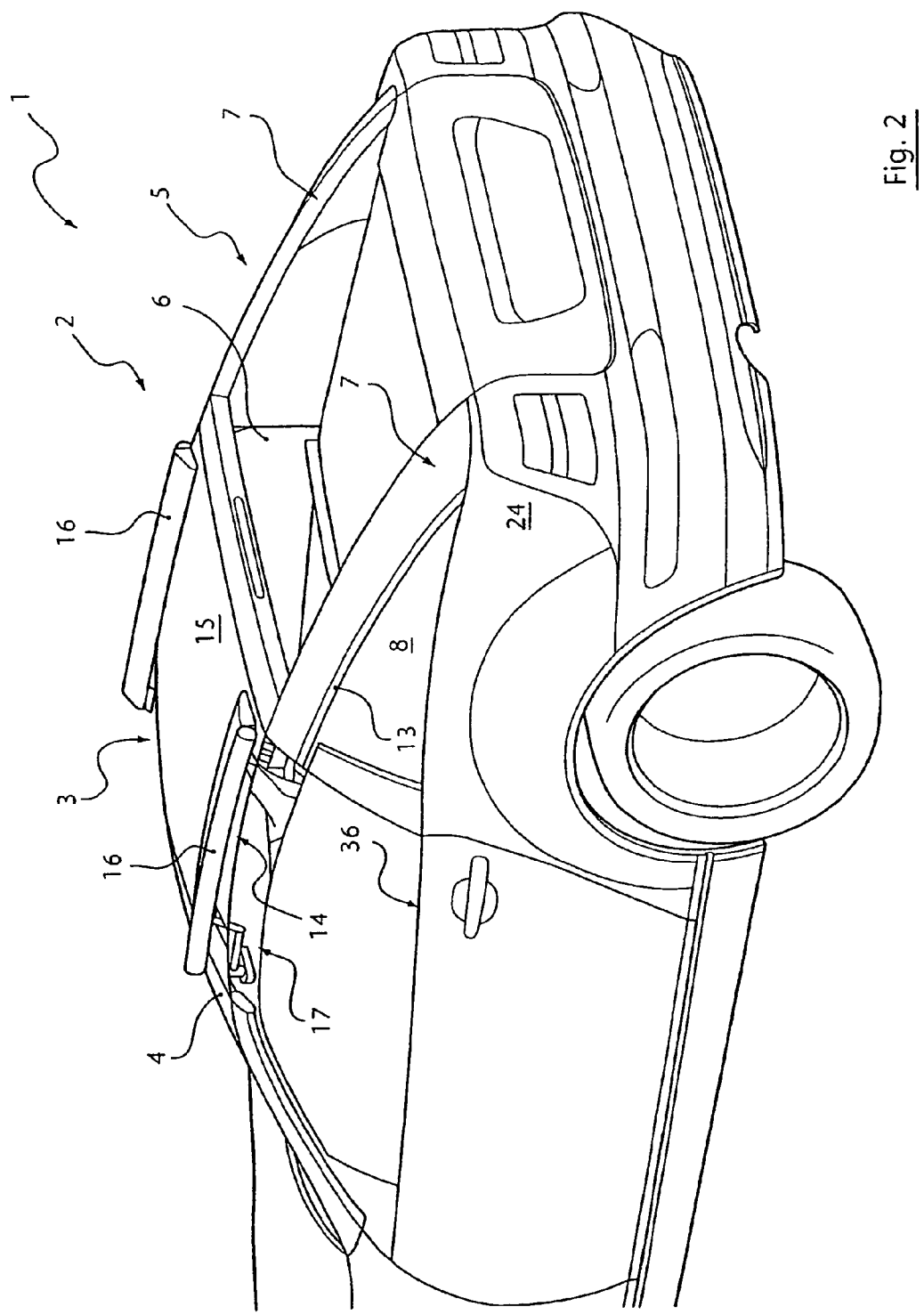
FIG. 2 shows a view similar to that of FIG. 1 with the outer sections of the front roof part swung open towards the middle section.

The first embodiment of a motor vehicle 1 in accordance with the invention, which is illustrated, for example, in FIGS. 1 to 4, has a roof 2, which has at least one openable front roof part 3. This front roof part 3 extends in the longitudinal direction of the vehicle from a windshield frame 4 to a rear roof part 5, which comprises, among other things, a rear window 6, which in the present case is essentially vertically oriented. It is not necessary for the front, movable roof part 3 to be directly attached, as shown here, to the windshield frame 4. The roof 2 is designed as a so-called fin roof, i.e., in addition to the rear window 6, which is installed relatively far towards the front, it has tips 7 (often referred to as fins), which run laterally towards the rear and can be provided, for example, on the outside, with additional side windows 8. The rear window 6 can be lowerable.

The movable roof part 3 is positioned essentially horizontally when the roof 2 is closed; in the present embodiment, it extends over the entire width of the passenger compartment, and in the closed state, it is in contact with the upper edges of preferably lowerable side windows 9.

This contact is produced by sections 10 of frame parts, which are labeled as a whole with reference number 11.

Locking tongues or other positive-locking joining elements, e.g., hook-like parts that engage from above, can be used to secure the sections 10 on the windshield frame 4 and on the C-posts 13 of the rear roof part 5. In addition, the sections 10 are connected at separating lines 14 with a middle section 15 of the front roof part 3, such that this connection is movable and is released simultaneously with the movement of the locking mechanism of the roof part 3 with the windshield frame 4 and the C-post 13 of the rear roof part 5.

In the present embodiment, the separating lines 14 run in the longitudinal direction of the vehicle. The could also run slightly obliquely to the longitudinal direction. It is also possible that sections 16 of the movable roof part 3 that lie laterally on the outside with respect to a vertical longitudinal center plane E are not formed solely by the frame sections 10 but rather occupy a wider portion of the roof part 3. An arrangement of the separating lines 14 in the vicinity of the lateral outer edges at a distance of less than 20 centimeters is advantageous from the standpoint of keeping the weight of the inwardly displaceable outer sections 16 low.

In any case, the outer sections 16 can be moved between a normal position, in which they are flush with the middle section 15, and in which the roof part 3 has its full normal width (FIG. 1), and a position, in which they are inwardly displaced towards the middle section (FIG. 2), and in which the front roof part 3 is narrowed.

Figure 8:
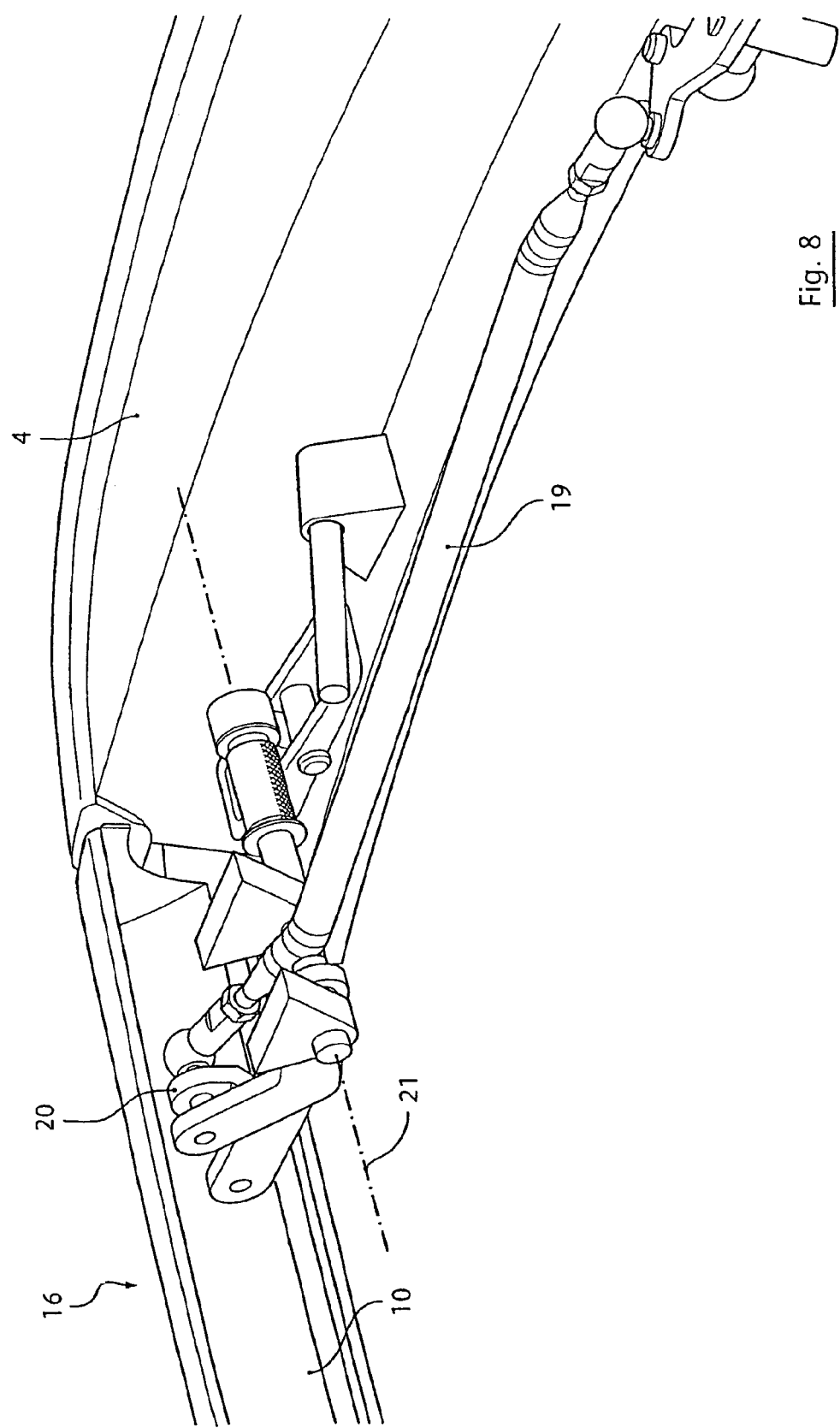
FIG. 8 shows the detail VIII in FIG. 7.
Figure 9:
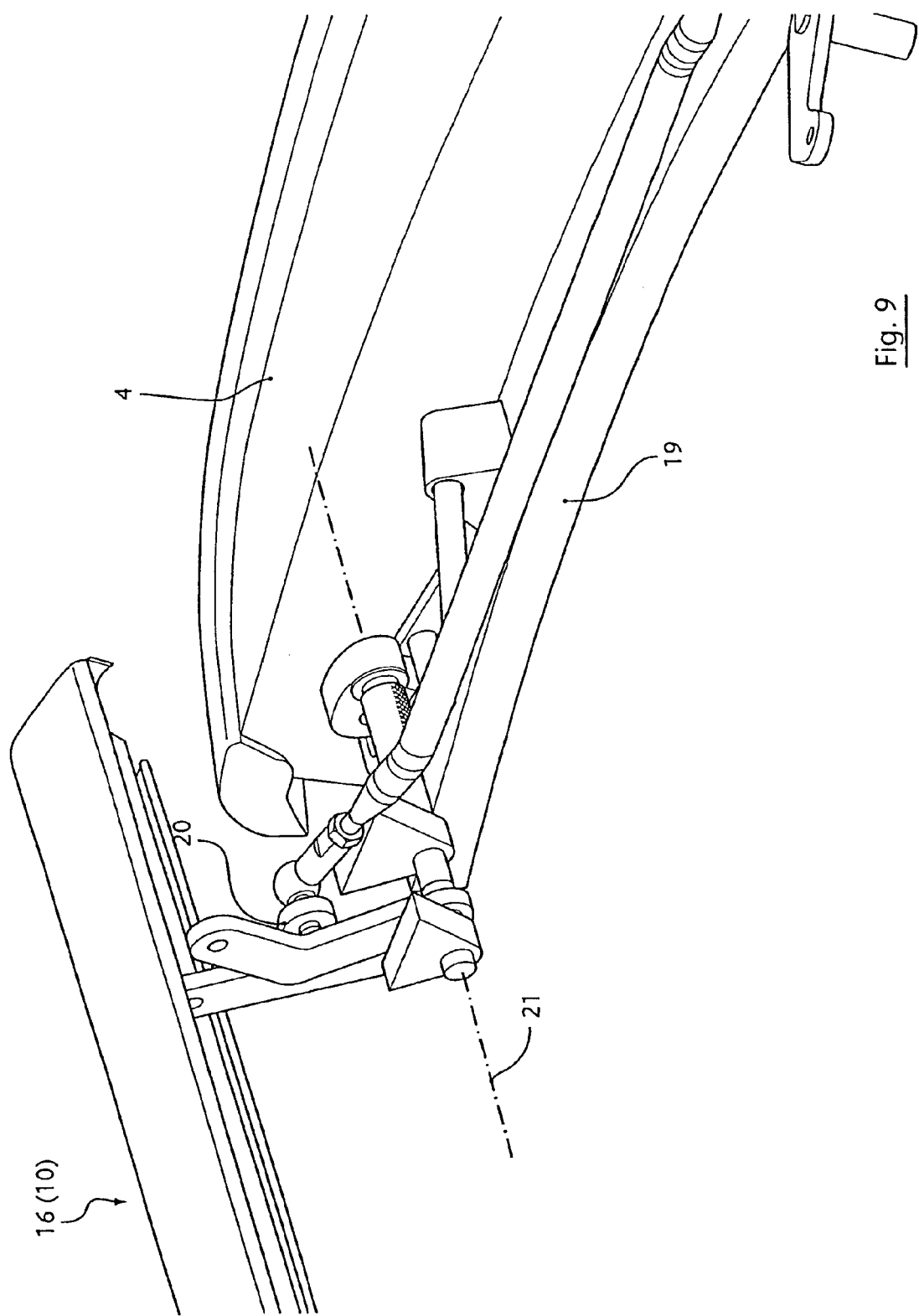
FIG. 9 shows a view similar to that of FIG. 8 as the outer sections are starting to swing open.
Figure 10:
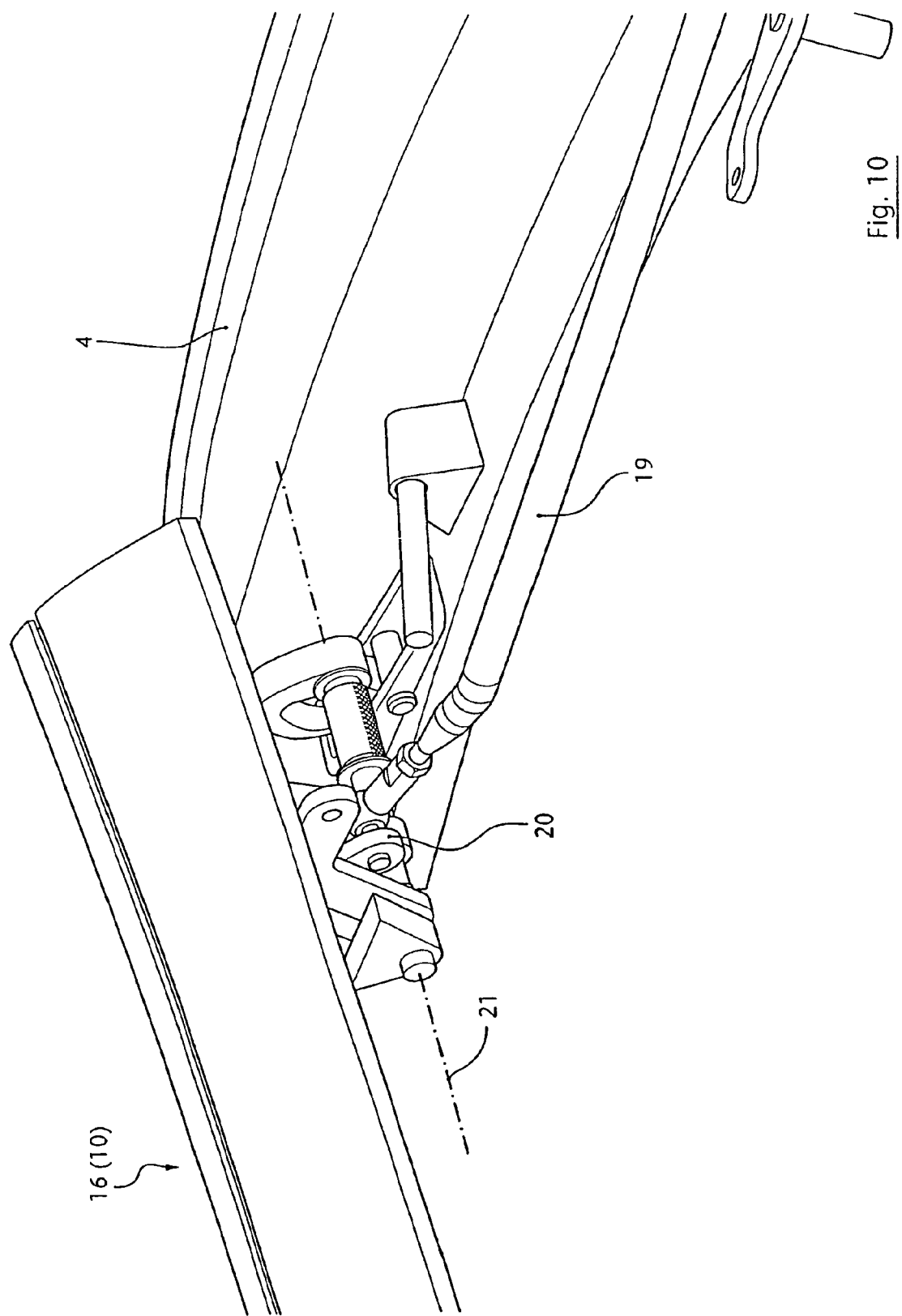
FIG. 10 shows a view similar to that of FIG. 9 with the outer sections swung open further.
Figure 11:
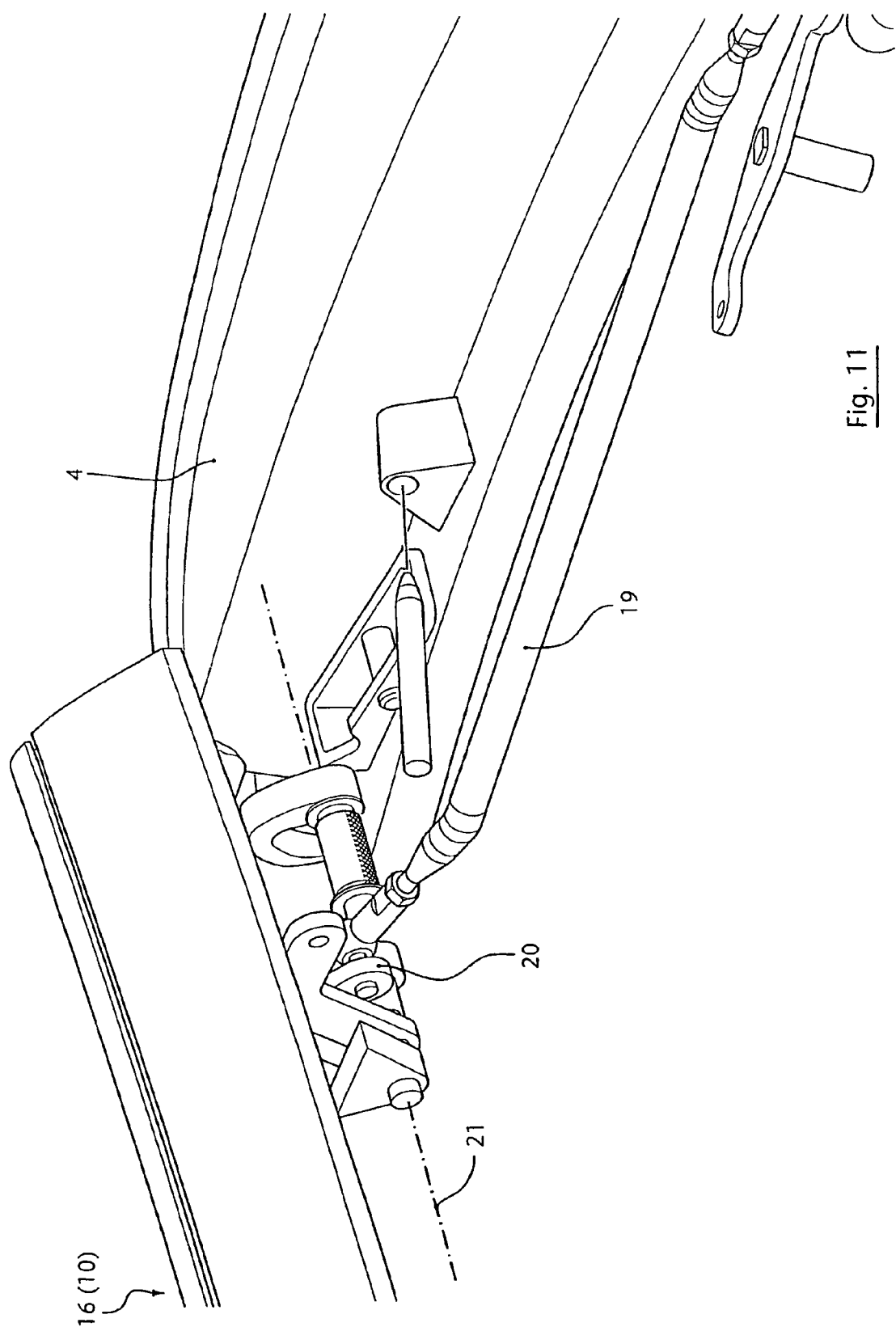
FIG. 11 shows a view similar to that of FIG. 10 during the rearward displacement of the movable roof part.
Figure 12:
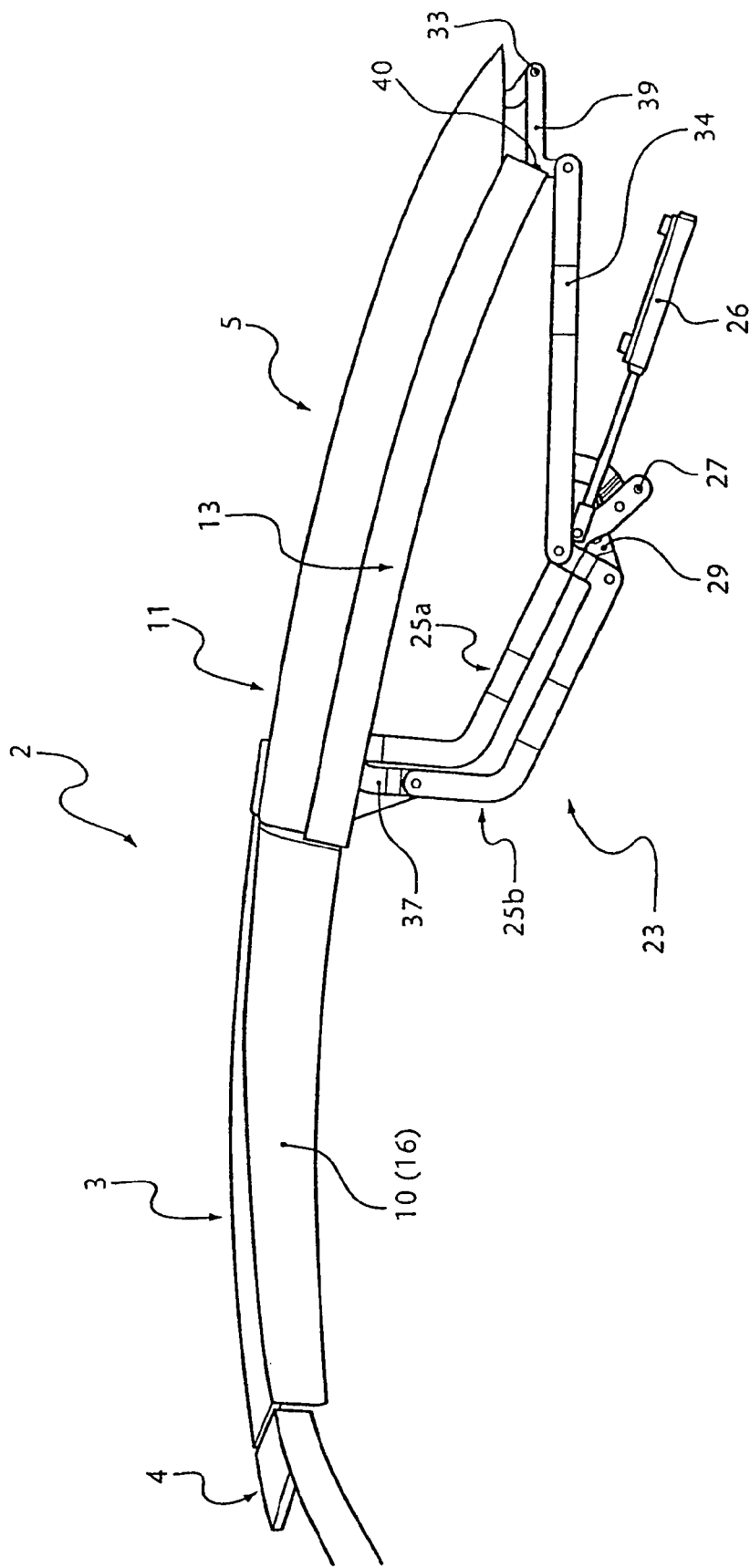
FIG. 12 shows a schematic side view of the roof in the position shown in FIG. 1.
Figure 13:
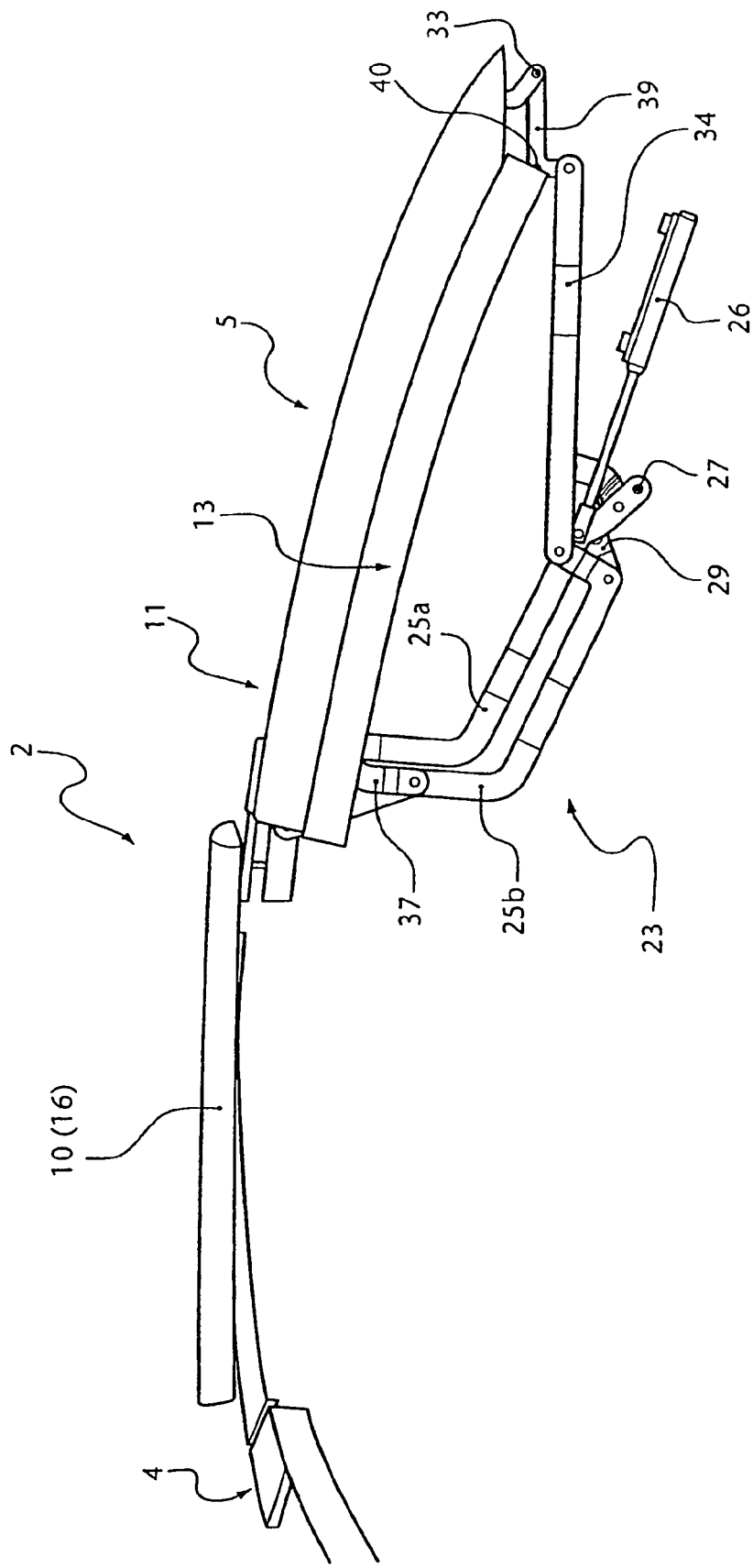
FIG. 13 shows a schematic side view of the roof in the position shown in FIG. 2.
Figure 14:
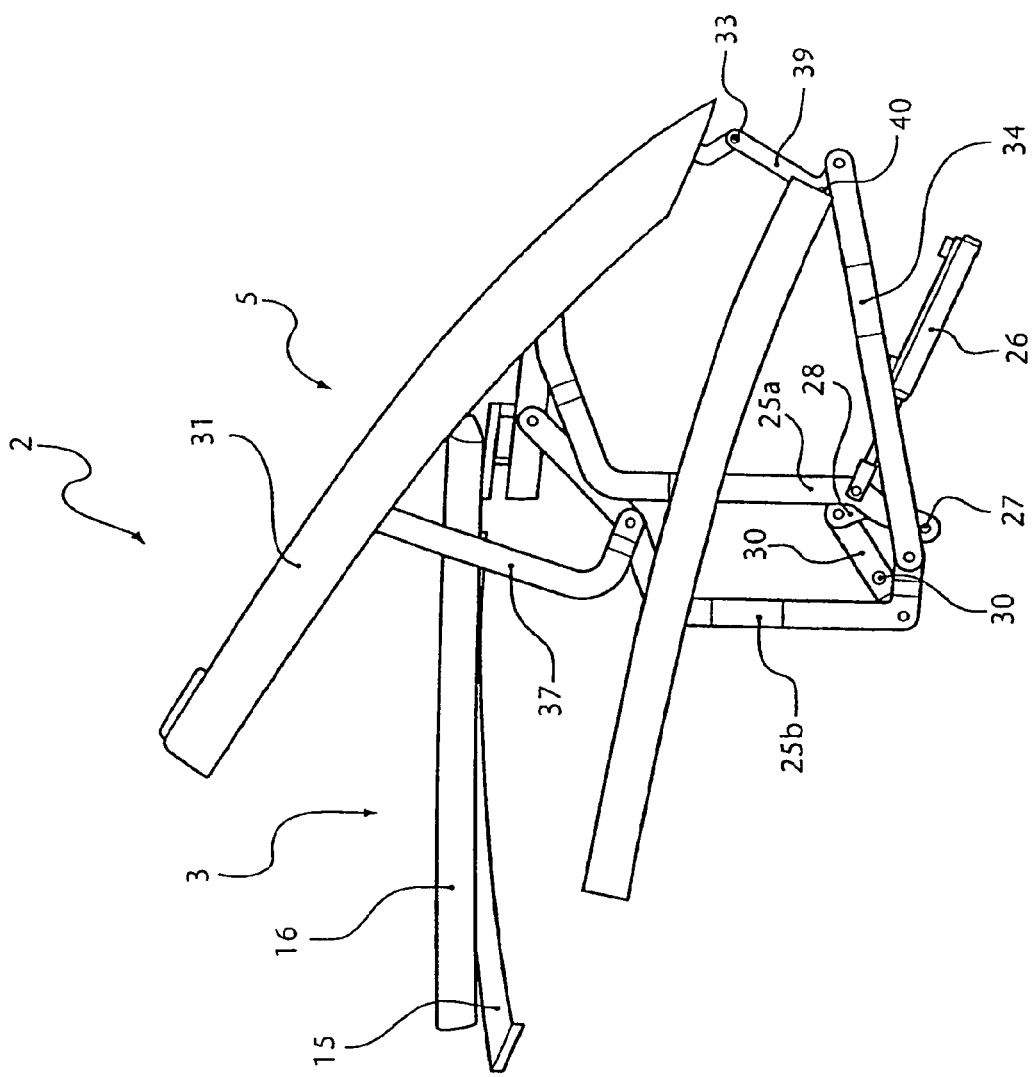
FIG. 14 shows a schematic side view of the roof in the position shown in FIG. 3.
Figure 14:
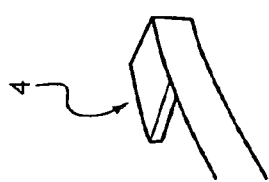
Figure 15:
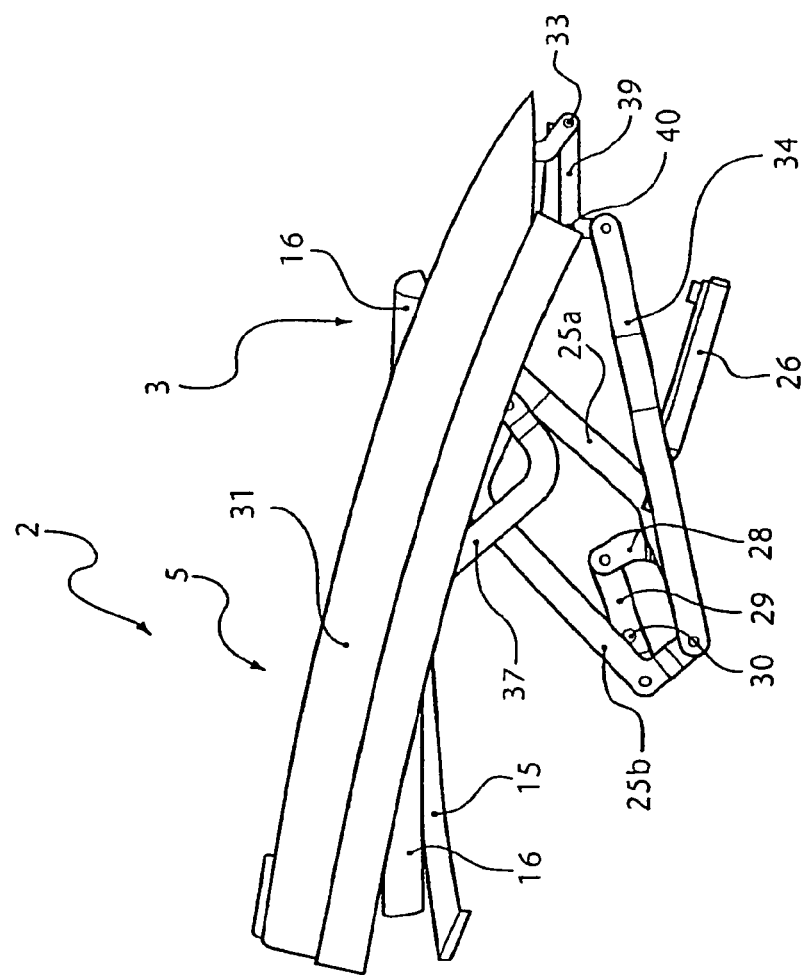
FIG. 15 shows a schematic side view of the roof approximately in the position shown in FIG. 4.
Figure 15:
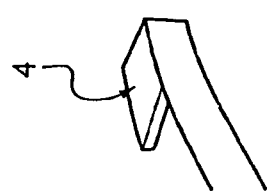

As is shown in the detail drawings of FIGS. 8 to 10, this displacement is a rotational displacement of about 90°, which is produced by two multijoint linkages 17 on each side of the vehicle. Simple swinging hinges can also be used.

Each multijoint linkage 17 can be moved by means of connecting rods 19 by a central actuating mechanism 18, which can be operated manually or with a motor. The connecting rods 19 act on levers 20, which apply a torque that acts relative to the longitudinal axes 21. The multijoint linkages 17 cause the outer sections 16, which in the present case are formed by the frame sections 10, not only to swing inward but also to be lifted at the same time. The middle section 15 can be assigned protective flaps 22, which can be displaced on the multijoint linkages 17 and allow the passage of the levers 20 through the middle section 15 in the narrowed position of the roof part 3. If simple swinging hinges are used, protective devices 22 of this type are unnecessary. Besides the illustrated inward rotation of the outer sections 16, other types of displacement are also possible in principle, including, for example, parallel running in of the outer sections 16 in a translational motion. When the outer sections 16 are swung in, they are positioned in the narrowed position, in which they are rotated 90° towards the middle section 15.

In this narrowed position, the lateral frame parts 11 are interrupted between the A-posts of the windshield frame 4 and the C-posts 13, and the front roof part 3 can be opened in this narrowed position towards the rear between the tips 7 of the fin roof 2.

Figure 3:
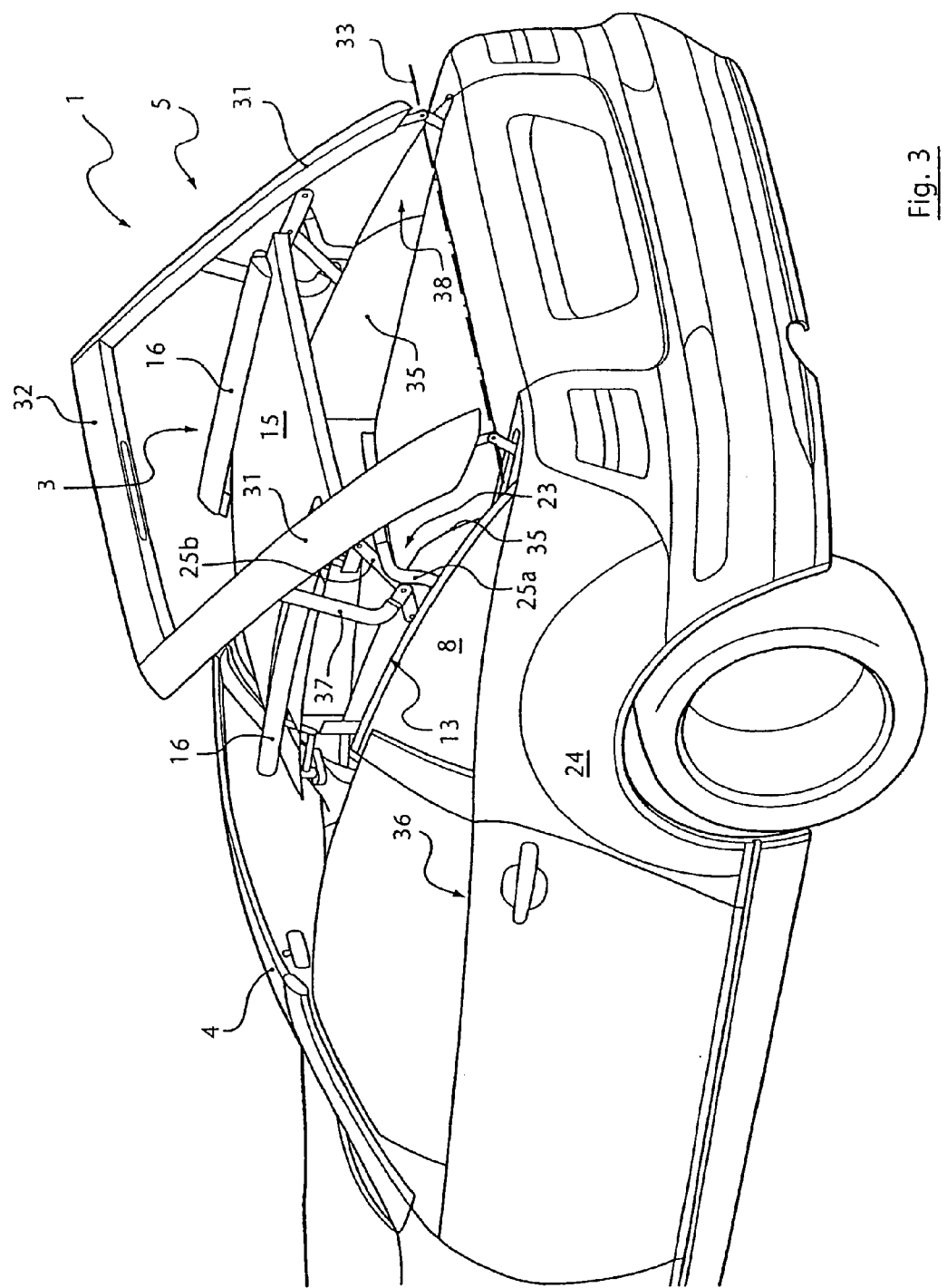
FIG. 3 shows a view similar to that of FIG. 2 with the frame of the rear roof part swung open during the opening movement of the front roof part in its state of narrowed width.

To this end, the middle section 15 of the roof part 3 has an independent linkage 23, on which it is movably supported relative to the automobile body 24. Therefore, no displacement in lateral guide rails is necessary to open or close the roof part 3. The linkage 23 is visually concealed at the sides by the tips 7 of the fin roof. Its links 25a, 25b are guided in slotted recesses, which lie parallel to the fins 7 and extend essentially over their entire length (FIG. 3). The linkage 23 can be moved, for example, by an electric or hydraulic driving mechanism 26, which is supported at one end in a fixed position with respect to the automobile body and acts on a link 25a with its other end. The link 25a is likewise supported on the pivot joint 27 in such a way that it is fixed with respect to the automobile body and acts on the front link 25b via two swivel levers 28, 29, of which the latter is supported on the joint 30 in such a way that it is fixed with respect to the automobile body. This results in the formation of a multijoint linkage, which allows an initially essentially linear displacement of the roof part 3 to open it. The lowered position of the opened roof part 3 can also lie essentially horizontally between the fins 7 (FIG. 4), and in this position, the outer sections 16 remain in their swung-in position, in which the roof part 3 is narrowed.

The actuation of the swiveling movement of the outer sections 16 of the roof part 3 can be remotely controlled from the dashboard, as can the total movement to open or close it. Both sequences of movements can be coupled with one another by program logic in order to avoid operating errors.

Figure 4:
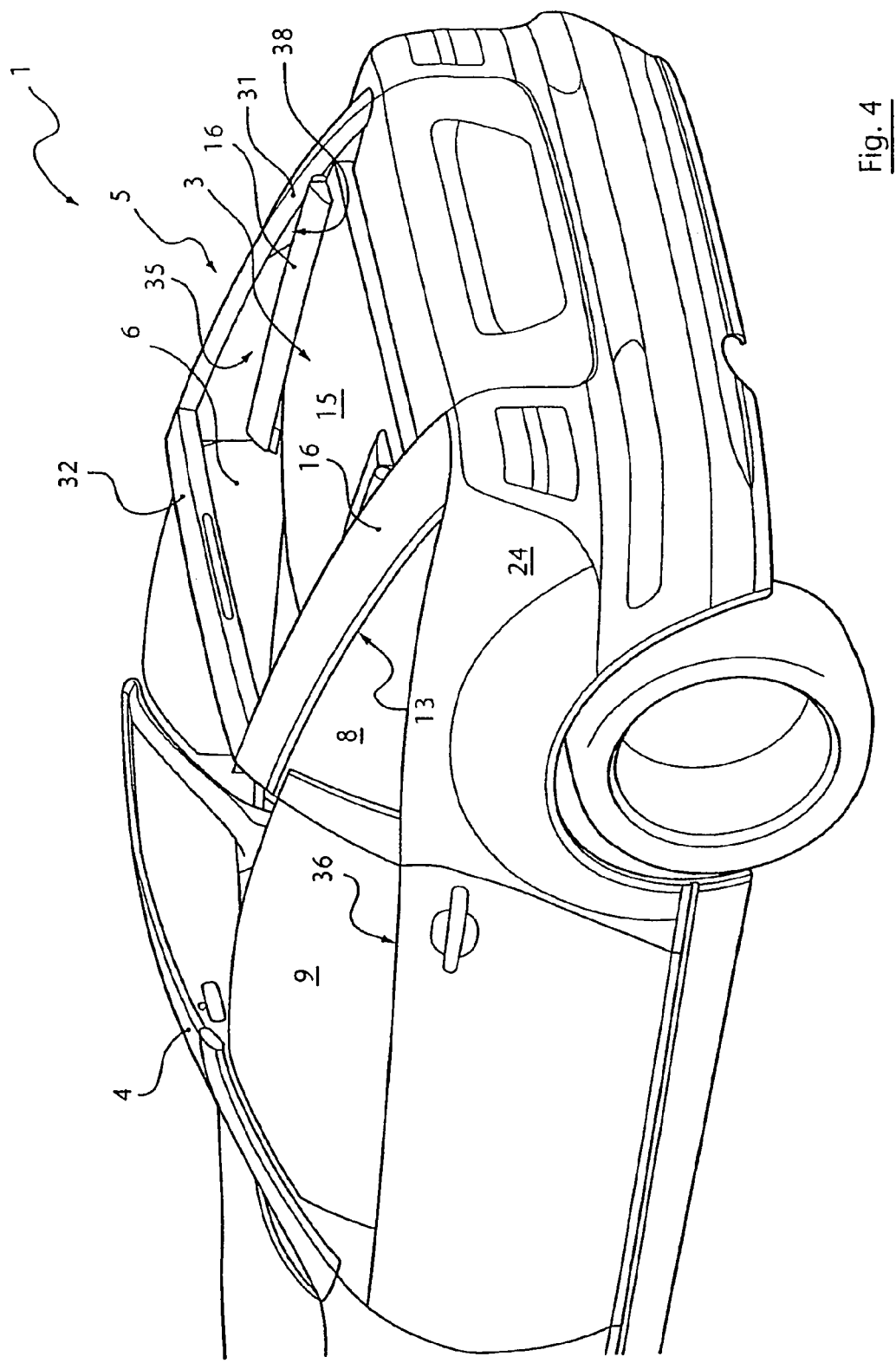
FIG. 4 shows a view similar to that of FIG. 3 with the movable roof part completely lowered and the swivel frame of the rear roof part closed.

To allow the opening of the narrowed roof part 3, a part of the rear roof part 5 can swing open, as is shown, for example, in FIG. 3. In this first embodiment, lateral cover frame parts 31, which rest on the fins 7 and are joined with each other by a transverse frame part 32 that swings open with the lateral frame parts 31, rotates about a rear axis 33. The axis 33 is not necessarily fixed with respect to the automobile body but rather, for example, is connected with the link 25b by a coupling lever 34 and a swivel lever 39, which is supported on a joint 40 in such a way that it is fixed with respect to the automobile body, so that it rises above the belt line 36 when the driving mechanism 16 is moved in. Another coupling lever 37, which is connected with the link 25b, is provided to allow the frame parts 31 to rotate about the axis 33. In the position in which the frame parts are swung open, the slot recesses are thus freely accessible to the linkage 23. The slot recesses are arranged between outer windows 8 and inner linings 35 of the fins 7, which (inner linings 35) are directed towards the longitudinal center plane E of the vehicle. In this open position of the frame parts 31, 32, the linkage 23 can move freely and thus move the front roof part 3 between its narrowed closed position and its open position. As a result of the fact that the inner linings 35 do not extend all the way to the rear tip of the fins 7 but rather leave an open region 38 towards the fins 7, the frame parts 31, 32 can be closed again over the front roof part 3, which has been horizontally lowered between the fins (FIG. 4). As shown in FIG. 4, a vehicle with a targa roof is thus formed.

Figure 5:
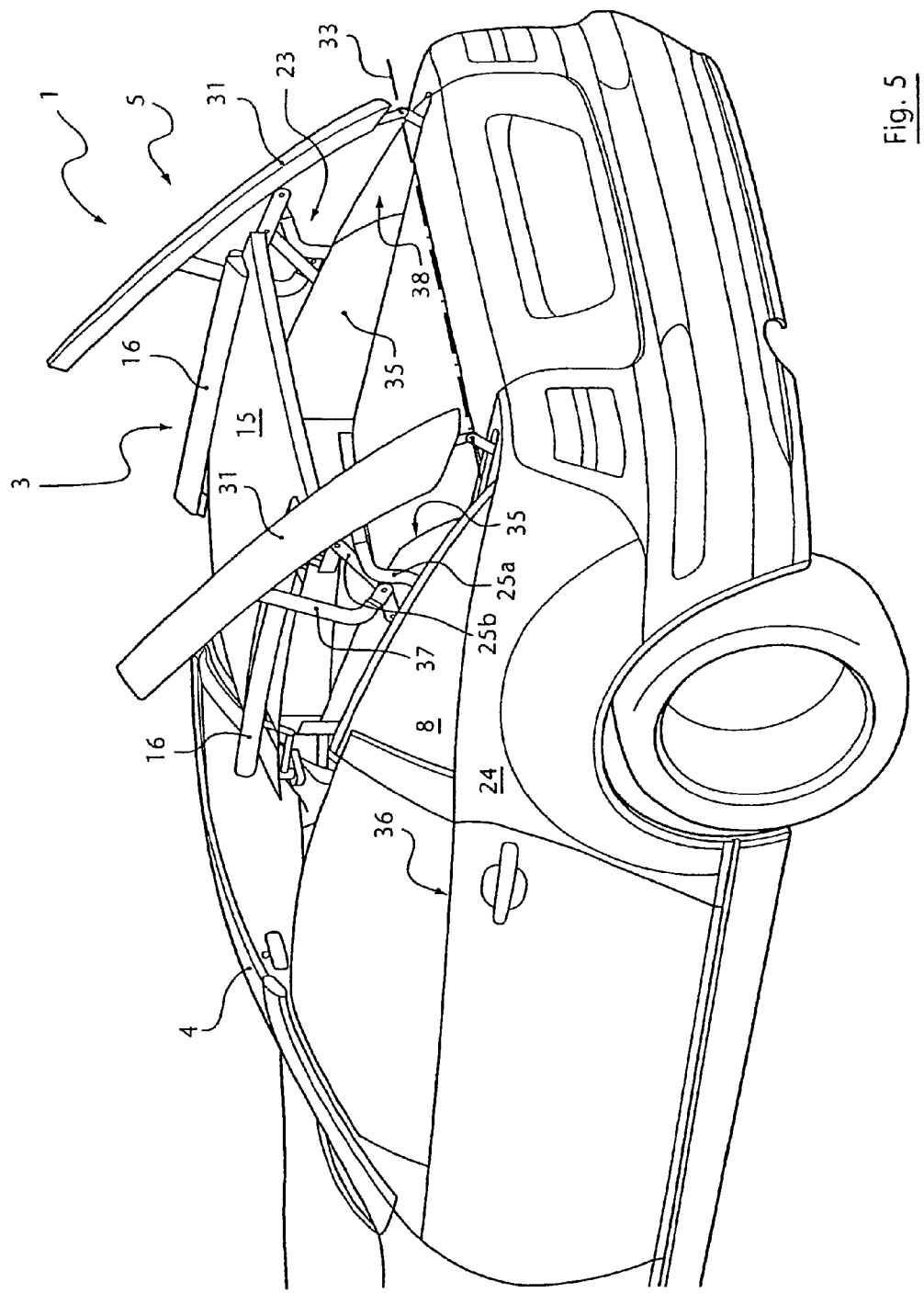
FIG. 5 shows a view similar to that of FIG. 3 with an alternative rear roof part, which comprises only longitudinal frame parts that can be swung open without a transverse frame part joining them.

FIG. 5 shows an alternative embodiment, in which the lateral, longitudinally extending frame parts 31 are not joined with each other by a transverse frame part 32. The opening kinematics for the roof parts 3 and 5 are otherwise unchanged.

Figure 6:
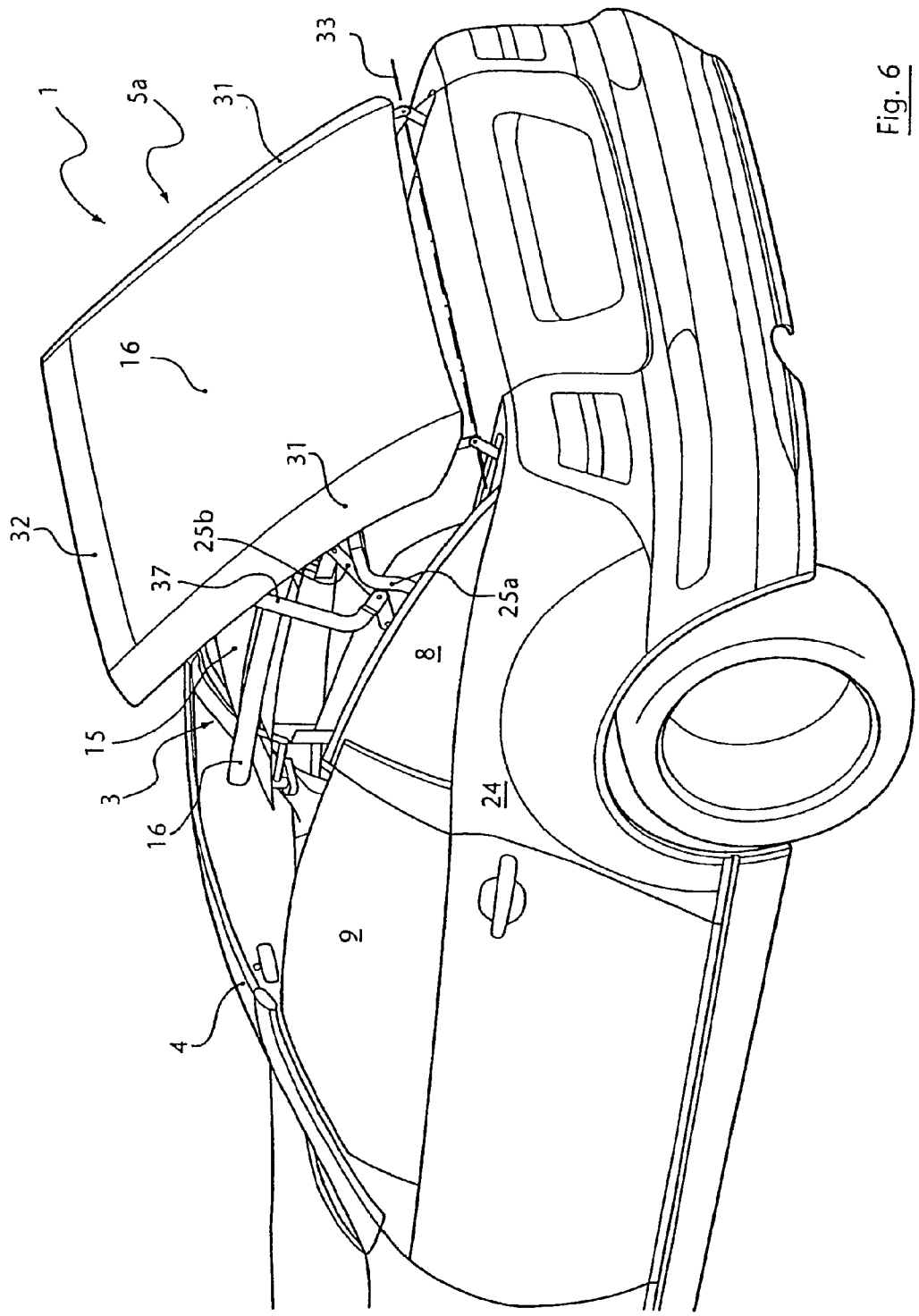
FIG. 6 shows a view similar to that of FIG. 5 with another alternative rear roof part, which can be swung open together with a rear window with an oblique orientation in the closed position.
Figure 7:
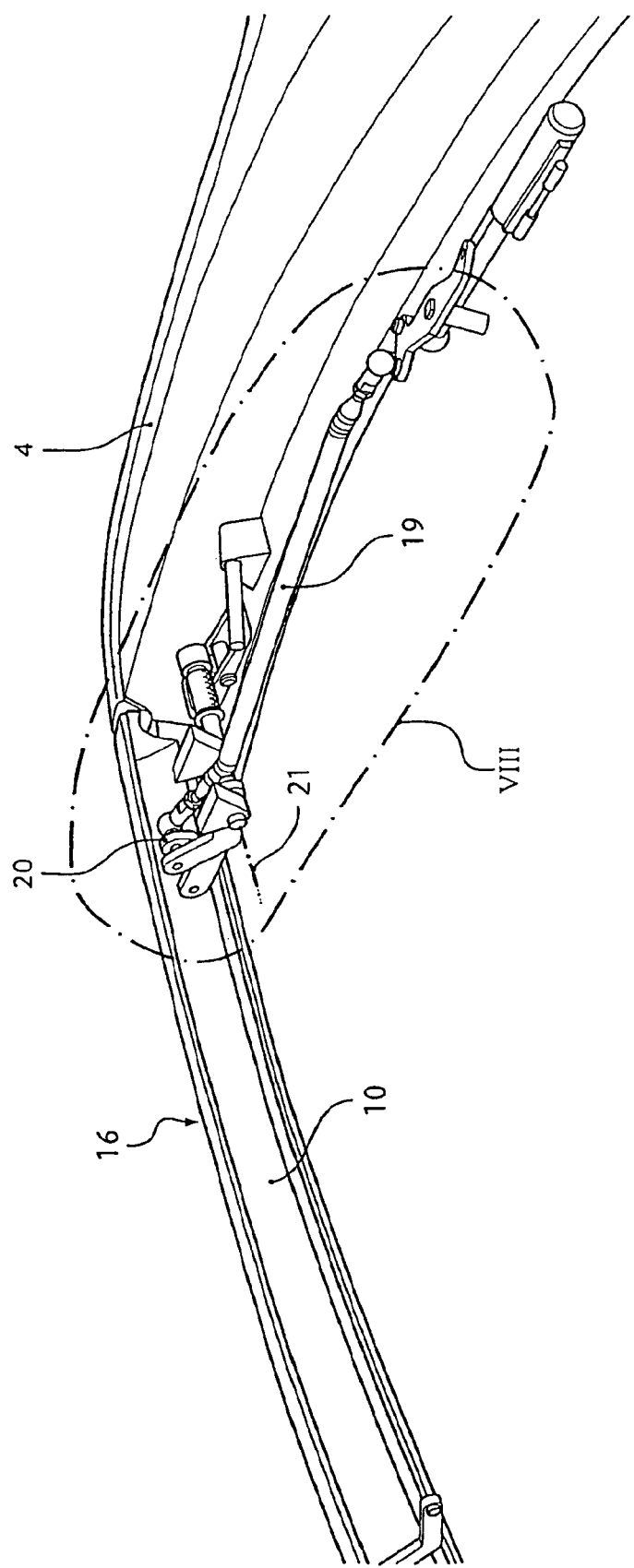
FIG. 7 shows a detail view of the rotational mechanism for the outer sections of the front roof part in their position in the normal width of the roof part, corresponding approximately to a view from the direction of arrow VII in FIG. 1.

FIG. 6 shows another alternative embodiment, again in an open position similar to FIG. 3. The transverse frame part 32 is again present. In addition, an obliquely oriented rear window 6a is installed between the frame parts 31 instead of the vertical rear window 6. Strictly speaking, therefore, this design does not constitute a fin convertible top. Of course, the laterally longitudinally extending tips 7 are also present here. When the rear roof part 5a is closed over the lowered roof part 3, a vehicle with a targa roof is also formed here.

Depending on the design of the vehicle, it can also be possible for the rear roof part 5, 5a to be lowered over the lowered front roof part 3 below the belt line 36, in which case a full convertible vehicle is formed.

In addition, a rollover protection device can be provided in the area of the B-posts and the rear window 6. The opening for the passage of the movable roof part 3 then lies above the rollover protection device and is thus not restricted by the rollover protection device.

The invention claimed is:

1. A motor vehicle (1) with a roof (2) that has at least one movable roof part (3) which can be moved as a whole between an open position and a closed position and which, in the closed position, extends between the area near a windshield frame (4) and a rear roof part (5, 5a), wherein the movable roof part (3) is divided into several connected sections (15, 16) in such a way that it can be varied between a normal width and a narrowed width by displacement of sections (16), and, when it is in its state of narrowed width, it can be moved between its open position and its closed position, and that to produce this narrowed width, the outer sections (16) are lifted at the same time.

2. The motor vehicle in accordance with claim 1, wherein the movable roof part (3) is divided into a middle section (15) with respect to a vertical longitudinal center plane (E) and two outer sections (16).

3. The motor vehicle (1) in accordance with claim 1, wherein, when the movable roof part (3) has its normal width, it occupies the full transverse extent between the upper edges of side windows (9) of the motor vehicle (1), and the separating lines (14) are located at a distance of less than 20 centimeters from the upper edges of the side windows (9).

4. The motor vehicle in accordance with claim 3, wherein the outer sections (16) constitute lateral frame parts (10), which, in the normal position, form a section of lateral roof frames (11) between a windshield frame (4) and a rear roof part (5, 5a).

5. The motor vehicle in accordance with claim 4, wherein in the closed position of the roof, the frame parts (10) are locked on at least one of the windshield frame (4) and the rear roof part (5, 5a), and that this lock can be released by the inward displacement of the outer sections (16).

6. The motor vehicle (1) in accordance with claim 1, wherein the middle section (15) is supported on a linkage (23) in such a way that it can be independently moved and that it can be moved by the linkage (23) between the open position and the closed position.

7. The motor vehicle in accordance with claim 1, wherein the outer sections (16), which are located laterally on the outside with respect to a vertical longitudinal center plane (E), can be swung inward towards the middle section (15).

8. The motor vehicle in accordance with claim 7, wherein a multijoint linkage (17) is provided to effect this inward rotation.

9. The motor vehicle in accordance with claim 1, wherein it is a vehicle with a targa roof.

10. The motor vehicle in accordance with claim 1, wherein the movable roof part (3) can be lowered in an essentially horizontal open position above a rear-end, essentially horizontal region of the automobile body.

11. The motor vehicle in accordance with claim 1, wherein the rear roof part (5, 5a) can be swung open at least partially about a rear axis (33) to create an opening for the passage of the movable roof part (3) and can be swung closed again over the open roof part (3).

12. The motor vehicle in accordance with claim 1, wherein the rear roof part (5) is designed with a fin structure, and lateral cover frame parts (31) that rest on the fins (7) can be swung open about a rear axis (33) to create an opening for the passage of the movable roof part (3) and can be swung closed again over the open roof part (3).

13. The motor vehicle in accordance with claim 12, wherein a transverse frame part (32), which overlaps a rear window (6) situated between the fins (7), can also be swung open along with the lateral frame parts (31) of the rear roof part (5).

14. The motor vehicle in accordance with claim 11, wherein the movement of the frame parts (31, 32) is linked by program control with the displacement movement of the outer sections (16) of the front roof part (3).

15. The motor vehicle according to claim 1, wherein the roof part (5, 5a) is rigid.

16. The motor vehicle according to claim 10, wherein the movable roof part (3) can be lowered above a trunk lid.

* * * * *